United States Patent
Choi

(10) Patent No.: US 9,037,603 B2
(45) Date of Patent: May 19, 2015

(54) SYSTEM OF PROPOSING CREATIVE KEYWORD AND METHOD OF PROPOSING CREATIVE KEYWORD USING THE SAME

(71) Applicant: Hyun Wook Choi, Daejeon (KR)

(72) Inventor: Hyun Wook Choi, Daejeon (KR)

( * ) Notice: Subject to any disclaimer, the term of this patent is extended or adjusted under 35 U.S.C. 154(b) by 224 days.

(21) Appl. No.: 13/751,194

(22) Filed: Jan. 28, 2013

(65) Prior Publication Data
US 2013/0198228 A1    Aug. 1, 2013

(30) Foreign Application Priority Data

Jan. 31, 2012   (KR) ........................ 10-2012-0010102

(51) Int. Cl.
| | | |
|---|---|---|
| G06F 7/00 | (2006.01) | |
| G06F 17/30 | (2006.01) | |
| G06F 13/14 | (2006.01) | |

(52) U.S. Cl.
CPC ...... *G06F 17/30864* (2013.01); *G06F 17/3064* (2013.01); *Y02B 60/188* (2013.01)

(58) Field of Classification Search
CPC .................. G06F 17/30327; G06F 17/30333; G06F 17/30598; G06F 17/30873
USPC ............................ 707/1/1, 722, 737, 999.002
See application file for complete search history.

(56) References Cited

U.S. PATENT DOCUMENTS

| | | | |
|---|---|---|---|
| 6,879,980 B1 * | 4/2005 | Kothuri et al. ................ | 707/765 |
| 7,774,381 B2 * | 8/2010 | Kothuri et al. ................ | 707/803 |
| 7,805,266 B1 * | 9/2010 | Dasu et al. ...................... | 702/66 |
| 7,856,434 B2 * | 12/2010 | Gluzman Peregrine et al. ............................. | 707/722 |
| 8,171,025 B2 * | 5/2012 | Tsai et al. ...................... | 707/736 |
| 8,275,762 B2 * | 9/2012 | Gupta et al. .................. | 707/713 |
| 8,676,802 B2 * | 3/2014 | Zelevinsky et al. ........... | 707/737 |
| 2002/0147703 A1 * | 10/2002 | Yu et al. ............................ | 707/2 |
| 2010/0131496 A1 * | 5/2010 | Strehl et al. ................... | 707/722 |

* cited by examiner

*Primary Examiner* — Usmaan Saeed
*Assistant Examiner* — Cecile Vo

(57) ABSTRACT

A system of proposing a creative keyword and a method thereof are provided, in which the system includes a search server which receives the request for search from a user terminal, analyzes in a real-time basis energy consumption of coordinate regions according to a plurality of information searched by an extracted user's keyword, and modifies association among the searched words by increasing or decreasing accessibility to associated searched words related to the request for search based on the analysis, wherein the user terminal which requests search by transmitting the user's search keyword to the search server, and receives and displays on a screen the resultant associated words.

3 Claims, 5 Drawing Sheets

SYSTEM OF PROPOSING CREATIVE KEYWORD AND METHOD OF PROPOSING CREATIVE KEYWORD USING THE SAME

CROSS-REFERENCE TO RELATED APPLICATION

This application claims priority to and the benefit of Korean Patent Application No. 10-2012-0010102 filed on Jan. 31, 2012, in the KIPO (Korean Intellectual Property Office), the disclosure of which is incorporated herein by reference in its entirety.

BACKGROUND OF THE INVENTION

1. Field of the Invention

The present invention relates to a method for creating associated search keywords, and more particularly, to a system of proposing creative search keywords and a method using the same.

2. Description of the Related Art

Internet users generally input search keywords in the information search system such as a web search program to locate intended information. For the users' convenience, the search system may provide the users with a list of associated words including the words that are associated in their meaning to the inputted keyword. By way of example, a user may have different outcomes between when he inputs keyword 'train' in the web search program and when he inputs keyword 'high-speed train', but the outcomes may include a keyword that can bring about more desirable result.

People sometimes do not recall a suitable keyword to input into the web search program. For example, a user who wants to find about 'high-speed train' may not recall the exact word, but only recalls the word 'train'. When the user inputs the word 'train', the web search program may provide not only the information acquired by the word 'train', but also a list of associated words possibly including the word 'high-speed train'.

Accordingly, the user may try another search with the word 'high-speed train'.

The list of related words may include words associated in their meaning to the inputted keyword, such as hypernyms, hyponyms, synonyms, related words, substituting words, etc. Further, by utilizing the etymology of the words, the words with statistical relevancy such as independent or dependent developments of the words may be included in the list. The list of associated words may additionally include words that are linked from various viewpoints.

For example, to a user who inputs a keyword 'KIM Yu-Na', the Korean female figure skater, a list of associated words may be provided, including: 'Suri High School' that Kim Yu-Na went to; 'Vancouver Winter Olympic Games/Pyeongchang Winter Olympic Games'; 'Kiss and Cry'—the television entertainment program that featured Kim Yu-Na; 'Asada Mao'—the rival Japanese female figure skater; 'Air conditioner TV commercial' that features Kim Yu-Na; or other various associated words.

The user provided with the list of associated words is able to input various additional words associated with the keyword he initially inputted and therefore, provided with a broader or more exact search range.

However, it takes professionals a considerable cost and time to work on the creation of the list of associated words. Accordingly, to automate the process of creating the list of associated words, various automation methods have been proposed, including simultaneous occurrence cartography which defines association among the words based on the possibility of simultaneous occurrence, and cartography which defines words frequently appearing in each categorized document networks as the associated words. One of the methods to create a list of associated words automatically is to create a list of words including part of the keywords inputted by the user that are actually executed, and in response to an input of a new keyword to the associated word search device, to identify associated words of the new keyword and provide the same to the user. However, because these methods generally consider statistical relationship, (without considering relationship among the words in terms of meaning), problem arises that the relationship among the automatically-created associated words is sometimes not quite convincible.

To provide a list of associated words, an information search system may evaluate association between an inputted keyword and another word, select a word with high association, and include the selected word in the list of associated words. The quality of the list of associated words may be evaluated based on whether the association among the inputted keyword and the words of the list of the associated words is convincible enough. Accordingly, an evaluation method is necessary, which can effectively evaluate association between an inputted keyword and another word.

SUMMARY OF THE INVENTION

Aspects of the present inventive concept overcome the above disadvantages and other disadvantages not described above. Also, the present inventive concept is not required to overcome the disadvantages described above, and an exemplary embodiment of the present inventive concept may not overcome any of the problems described above.

Accordingly, a technical objective is to store information about associated keywords searched by a user, analyze probabilistic association among the keywords and proposing a new associated keyword.

In accordance with one aspect of the present invention, there is provided a method of proposing a creative keyword on an internet search site is provided, which may include first setting step of setting coordinate regions of a plurality of memories of a database of a search server, and setting a plurality of information into a basic unit of network, modifying step of modifying user-inputted information at the search server into the basic unit of network, requesting step of retrieving from the database, information including at least (n) number of regions of the network coordinate regions of the basic unit, according to the user-inputted information at the search server, second setting step of overlapping the information including the at least (n) number of network regions, and setting a first limit region at a region including less than (m) number of network regions, comparing step of comparing, at a processor, energy consumptions of the first limit region and neighboring regions, and accessibility increasing/decreasing step of proposing the users with an associated search word including less than the (m) number of regions according to the result of comparison, and increasing or decreasing accessibility to the associated search word depending on whether the proposed search word is selected by the users or not.

The first setting step may additionally include setting one of rules with various possibilities per basic unit, to a basic unit of network of the plurality of information.

The first setting step may include setting a network with a possibility in inverse relationship with a distance to another basic unit at a near distance, according to a rule applied to the basic units.

The first setting step may include expressing data stored on a site, knowledge, dictionary, news, blog, or multimedia in the form of network in coordinate format.

The requesting step may include re-setting so that a random and probabilistic rule is set per basic unit during an intermission period where there is no input or output of information to or from the database.

In one embodiment, a system of receiving a user request for search via a wired or wireless network and categorizing a result of search and providing a result in a real-time basis is provided, which may include a search server which receives the request for search from a user terminal, analyzes in a real-time basis energy consumption of coordinate regions according to a plurality of information searched by an extracted user's keyword, and modifies association among the searched words by increasing or decreasing accessibility to associated searched words related to the request for search based on the analysis, and the user terminal which requests search by transmitting the user's search keyword to the search server, and receives and displays on a screen the resultant associated words.

The search server may include a processor, and a database comprising a plurality of memory units. The processor may include a first setting unit which sets coordinate regions of a plurality of memories of a database of a search server, and sets a plurality of information into a basic unit of network, a modifying unit which modifies user-inputted information at the search server into the basic unit of network, a second setting unit which retrieves from the database, information including at least (n) number of regions of the network coordinate regions of the basic unit, according to the user-inputted information at the search server, overlaps the information including the at least (n) number of network regions, and sets a first limit region at a region including less than (m) number of network regions, a comparator which compares energy consumptions of the first limit region and neighboring regions, and a control unit which proposes the users with an associated search word including less than the (m) number of regions according to the result of comparison, and increases or decreases accessibility to the associated search word depending on whether the proposed search word is selected by the users or not.

The comparator may compare the operations of the respective regions according to the energy consumptions of the basic memory units included in the first limit region and the neighboring regions.

According to various embodiments, new association among the search keywords is proposed based on the information regarding association with the keywords known by the users, and the provided new association is modified in response to the user's reaction, so that new and useful associated search words are proposed.

Additional aspects and/or advantages of the invention will be set forth in part in the description which follows and, in part, will be obvious from the description, or may be learned by practice of the invention.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

Figure 1:
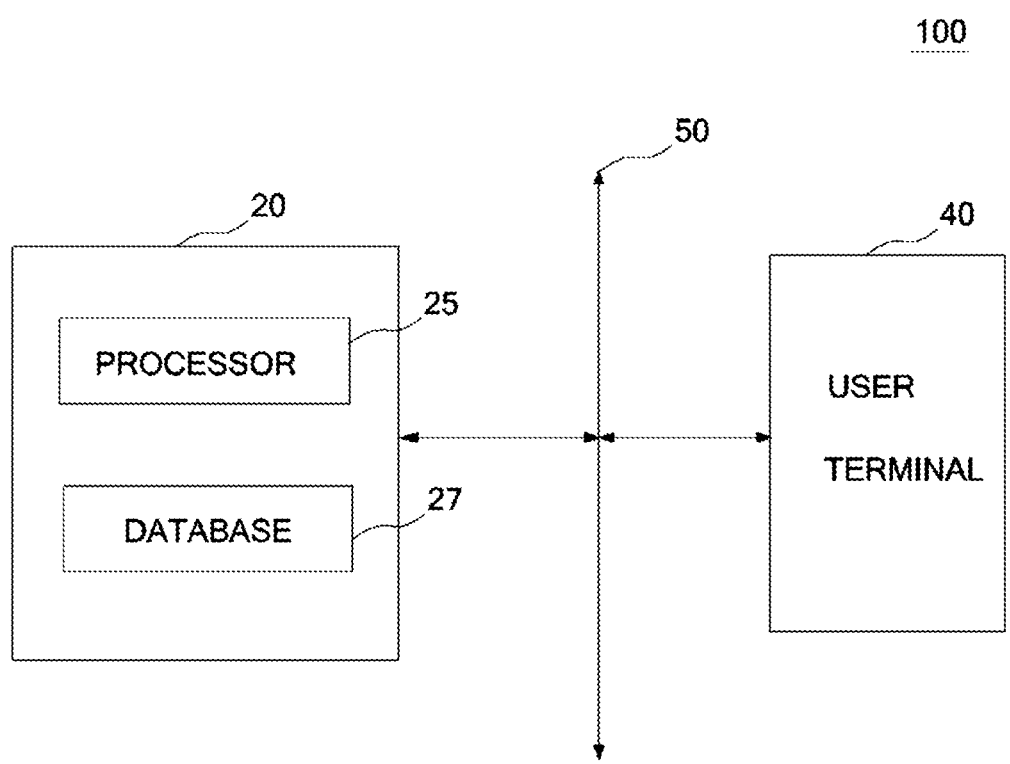
FIG. 1 is a block diagram of a system for proposing creative search words according to an embodiment.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The wording such as "first" and/or "second" may be used to describe various components, but should not be construed as limiting. The wording is used solely for the purpose of identifying one component from another. By way of example, certain component may be named "first component", "second component", or likewise, the "second component" may be named "first component".

It should be understood that the expression "connect(ed)" or "contact(ed)" may refer to direct connection or contact to another component, but this may not exclude an intermediate element that may exist in between. On the other hand, when one component is specifically mentioned as being "directly connected" or "directly contacted" to another, it should be understood that no other component exists in between. Expressions such as "between", "directly between", or "neighboring" or "directly neighboring" may also be understood from the same viewpoint.

Wordings used herein are to describe a specific embodiment, and therefore, should not be construed as limiting. A singular expression includes a plural form unless specified otherwise. Throughout the specification, the expression "comprise" or "have" is used to designate an existence of a certain feature, numeral, step, operation, component, part, or a combination thereof, and not to exclude a possibility of additional existence of one or more features, numerals, steps, operations, components, parts or combinations thereof.

Unless otherwise defined, the entire wordings used herein, including technical or scientific terms, carry the same meanings as generally understood by those with knowledge in the field of the invention. The terms as generally defined in the dictionaries are interpreted based on the meaning in agreement with the context of the related technology, and unless otherwise specified, may not be interpreted to ideal or excessively formal meaning.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

Figure 2:
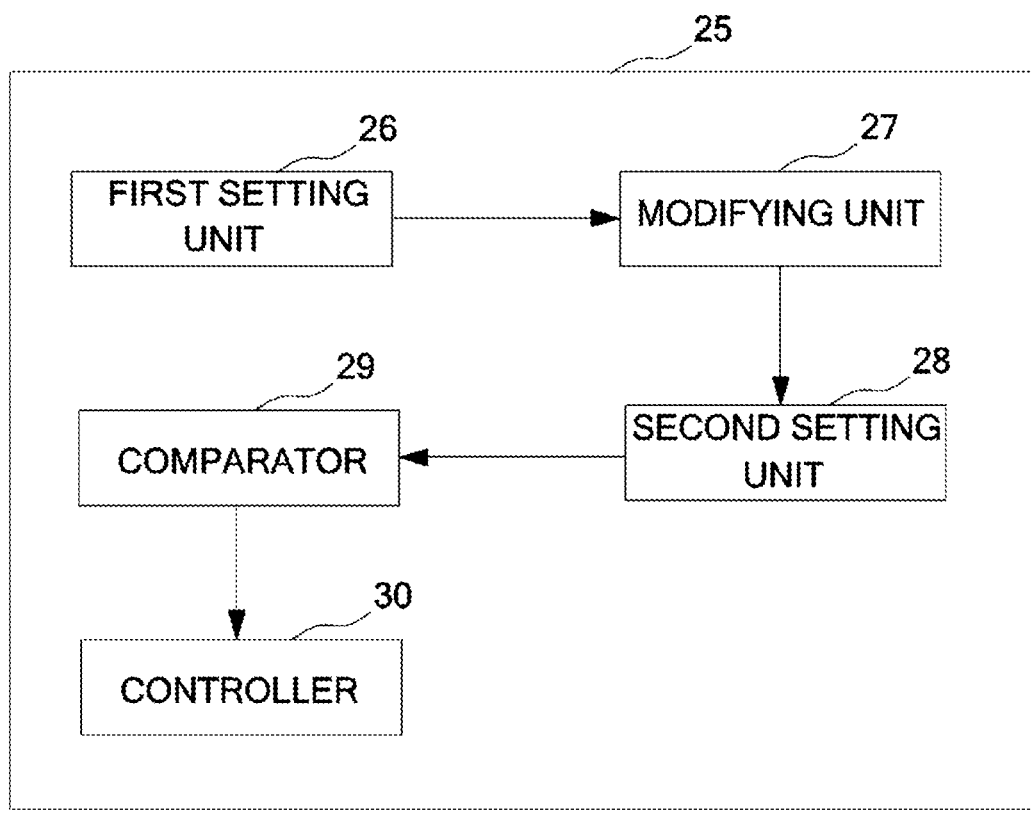
FIG. 2 illustrates an example of the processor of FIG. 1 in greater detail.

FIG. 1 is a block diagram of a system for proposing creative search words according to an embodiment, and FIG. 2 illustrates an example of the processor of FIG. 1 in greater detail.

Referring to FIGS. 1 and 2, the system 100 for proposing creative keyword according to an embodiment includes a search server 20, a user terminal 40 and a wired/wireless network 50.

The search server 20 includes a processor 25 and a database 27 including a plurality of memory units, and the processor 25 includes a first setting unit 26, a modifying unit 27, a second setting unit 28, a comparator 29, and a controller 30.

The first setting unit 26 sets coordinate regions of the plurality of memories of the database 27 of the search server, and sets a plurality of information into a basic unit of network.

The modifying unit 27 modifies the information inputted by the user to the search server 20 into the basic unit of network.

The second setting unit 28 retrieves from the database information including at least (n) number of regions of the basic unit of network coordinate regions according to the information inputted by the user to the search server, overlaps the information including at least (n) number of network regions on one another, and sets a first limit region on the region that includes less than (m) number of network regions.

The comparator 29 compares energy consumptions of the first limit region and the neighboring regions and transmits the result of comparison to the controller 30.

According to the result of comparison, the controller 30 proposes information including less than (m) number of regions to the user, increasing or decreasing accessibility to associated words depending on whether the user selects the same or not, and modifies the plurality of basic units within the database.

The user terminal 40 transmits a user-inputted keyword to the search server 20 and requests search, and receives from the search server 20 a resultant page on which the search result is categorized.

As used herein, the "wired/wireless network 50" encompasses all the communication networks that are capable of internet connection using, for example, mobile communication network, wired/wireless public network or private network.

The user terminal 40 includes a computer terminal, a mobile communication terminal or other portable terminal installed with a web browser to provide access to a homepage. For example, the user terminal 40 may refer to any model of terminal using any communication scheme which inputs a user-inputted keyword to a search window of a webpage to request a search server for search, receives from the search server a content-categorized page as a result of search, and displays the received page on a screen.

The search server 20 analyzes the words as a result of search by the user-inputted keyword, and categorizes the result of search in accordance with the association among the analyzed words and the user-inputted keyword. The search server then creates a page of search result, in which the searched results are categorized, and provides the same to the user terminal.

To be specific, the search server 20, on receiving a search request from the user terminal 40, analyzes energy consumptions of the coordinate regions in real-time basis according to a plurality of information searched in accordance with the extracted user-inputted keyword, and modifies the association of the searched words by increasing or decreasing accessibility to the associated search words to the search request information.

The functions and operations of the individual components of the search server 20 will be explained in detail below with reference to the search method.

Figure 3:
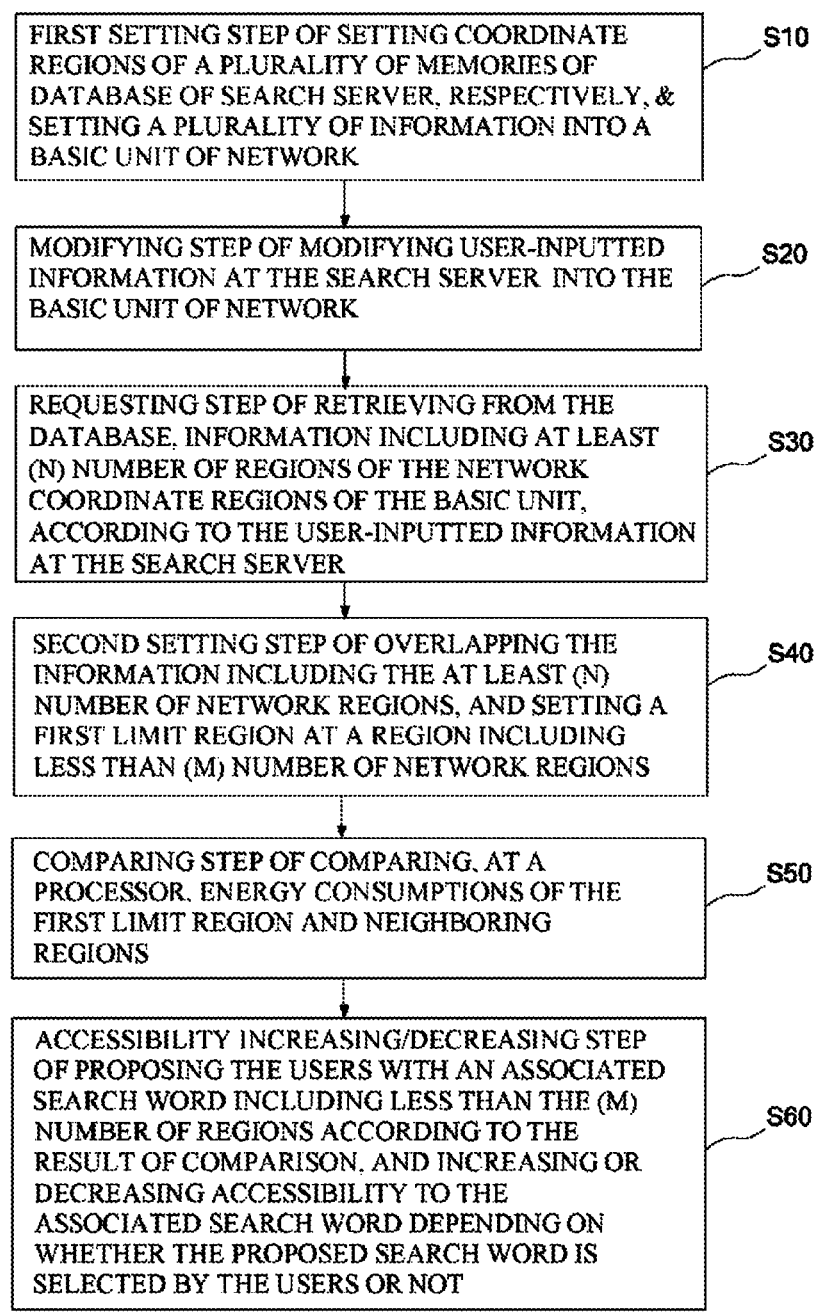
FIG. 3 is a flowchart provided to explain a method for proposing creative search words using the system of FIG. 1.

FIG. 3 is a flowchart provided to explain a method for proposing a creative search word according to an embodiment of the present invention.

Referring to FIG. 3, the method for proposing creative keyword includes steps of first setting at S10, modifying at S20, requesting at S30, second setting at S40, comparing at S50 and accessibility increasing/decreasing accessibility at S60.

The first setting at S10 may include setting coordinate regions of the plurality of memories of a database of a search server, and setting a plurality of information into a basic unit of network.

The modifying at S20 may include modifying the information inputted by the user into a basic unit of network.

The requesting at S30 may include retrieving from the database information including at least (n) number of regions of the basic unit of network coordinate regions according to the information inputted by the user to the search server.

The second setting at S40 may include overlapping the information including at least (n) number of network regions on one another, and setting a first limit region on the region that includes less than (m) number of network regions.

The comparing at S50 may include comparing energy consumptions of the first limit region and the neighboring regions.

The accessibility increasing/decreasing at S60 may include proposing information including less than (m) number of regions to the user based on the result of comparing, and increasing or decreasing accessibility to associated words depending on whether the user selects the same or not.

To be specific, the first setting at S10 may include setting coordinate information in the basic unit (i.e., basic memory unit) and expressing the information inputted by the user in the form of the basic unit of network. For example, the first setting at S10 may be the step of expressing data (e.g., words) stored on a site, knowledge, dictionary, news, blog, or multimedia in the form of network in coordinate format.

That is, the first setting at S10 categorizes pear, apple, fruit and plant product into networks respectively with coordinates 1:20 for pear, 1:14 for apple, 8:14, 27:39 for fruit, and 1, 2, 8, 9, 15, 16, 21, 22, 40 to 51 for plant product.

The first setting at S10 thus maintains the existent network or sets one of the rules with various possibilities per basic unit, thereby constructing a network in a possibility in inverse relationship with a distance to the other prominent basic unit (i.e., basic memory unit).

For example, the first setting at S10 may form a network based on association with the words having number of coordinates matching 70% of the number of user-inputted words and words having number of coordinates matching 80% of the number of user-inputted words.

The requesting at S30 may include retrieving from the database information including at least (n) number of regions of the basic unit of network coordinate regions according to the information inputted by the user to the search server, which may be performed per basic unit randomly during the intermitting period where there is no user input or output, causing voluntary activity to happen according to determined rule of possibilities.

That is, when a plurality of users searches the same word, the real-time search data may have different search ranking within the search server depending on time.

For the server's side, the word ranking is determined passively, but for the word's side, the ranking may be determined and appear in a real-time basis according to the number of activities (i.e., frequency of searches) in an order of first search to (n)th search.

The second setting at S40 may include overlapping the information including at least (n) number of network regions on one another, and setting a first limit region on the region that includes less than (m) number of network regions.

The accessibility increasing/decreasing at S60 confirms a new network by causing an activity at a basic unit of the coordinate which is previously stored when retrieving the necessary information, interprets the information meant by the new network by comparing with the existent networks, proposes the user with a resultant associated keyword, increases the accessibility to the new network if the user accepts the proposal, or decreases the accessibility to the new network if the user does not accept the proposal.

Figure 4:
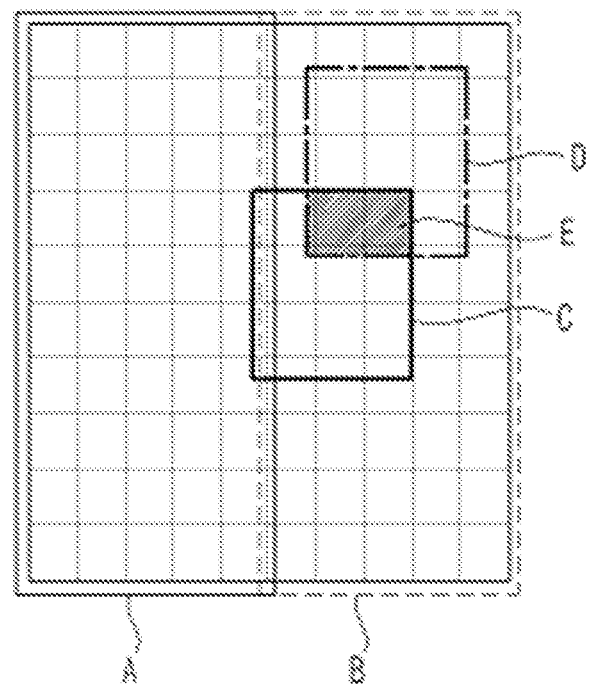
FIG. 4 schematically illustrates an example of two-dimensional view to explain the structure of a basic memory unit of database according to an embodiment.

FIG. 4 schematically illustrates an example of two-dimensional view to explain the structure of a basic memory unit of database according to an embodiment.

Referring to FIG. 4, a plurality of basic memory units each represents a basic unit and the network of the basic units represents search keywords. One basic unit may belong to several networks and may store various keywords. The network may be constructed as the coordinates of the other basic units of the network are designated.

For example, input and output regions are set within the cubical memory structure, where a first region A may be assumed to be "throw away", a second region B "eat", a third region C "apple", and a fourth region D be "pear".

The combination of the words displayed on the output region may include "eat apple" by 95% of the output region, "throw away apple" by 5%, "eat pear" by 100%" and "throw away pear" by 0%. Accordingly, "apple" and "pear" are similar to each other by 22% and different from each other by 78%.

As a result, a network of apple and pear based on the common feature thereof (i.e., fruit) is created.

The input and output regions may be divided into a plurality of input and output regions.

Figure 5:
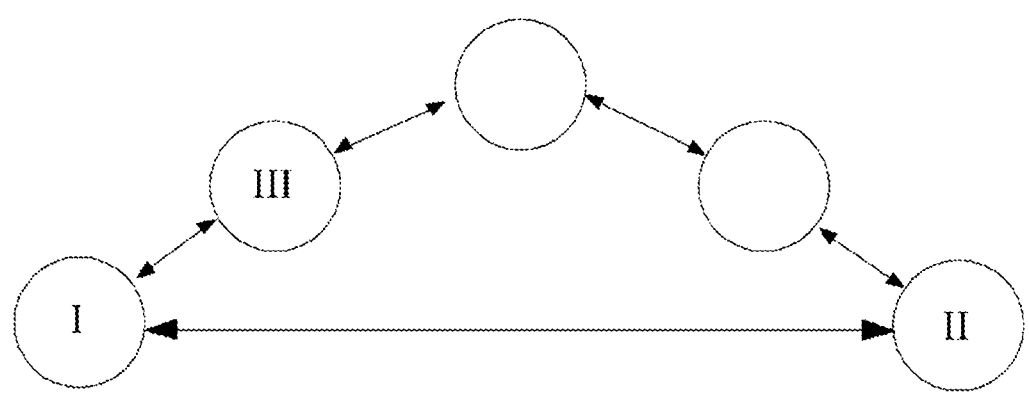
FIG. 5 illustrates an example of a method for generating a change in an existent network in accordance with repetitious activity of a basic unit.

FIG. 5 illustrates an example of a method for generating a change in an existent network in accordance with repetitious activity of a basic unit.

Referring to FIG. 5, it is assumed that there are two coordinates 'II' and 'III' of the other basic units that are stored at the basic unit 'I'. According to these coordinates, the network as illustrated in FIG. 4 is constructed, in which 'I' and 'II' constitute the network, while 'III' is unnecessary. Therefore, as the activities of 'I' and 'II' repeat, 'III' is omitted from the network.

Likewise, as the activities of 'I' and 'III' repeat, 'II' is removed from the network. If the activities of all (I, II, III) repeat, the network is maintained.

That is, a specific basic unit is selected depending on the frequency of the other basic units 'II' and 'III' stored in the basic unit 'I'.

Figure 6:
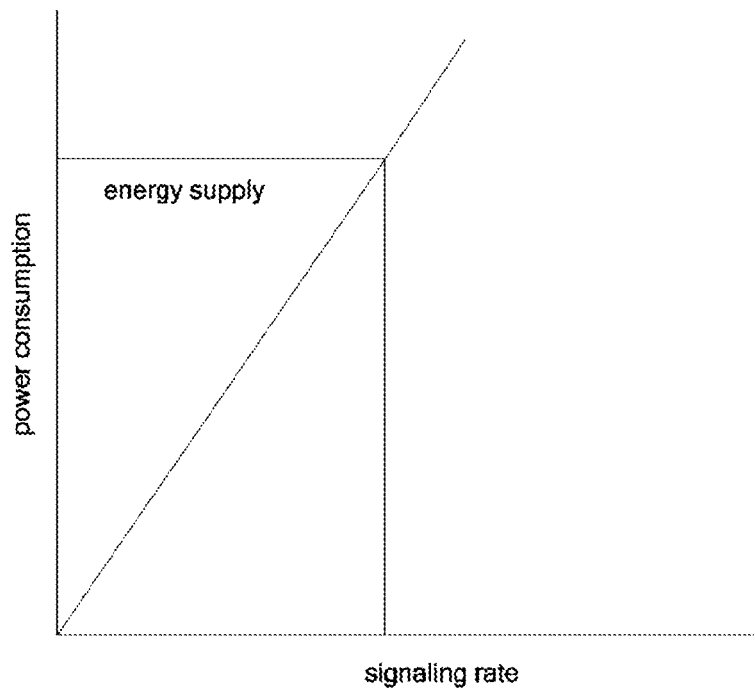
FIG. 6 is provided to explain how the voluntary activity of a basic unit is limited when limited power is supplied.

FIG. 6 is provided to explain how the voluntary activity of a basic unit is limited when limited power is supplied.

While the activities at basic unit level are necessary to maintain a network or create a new network, because of limited energy supply, activities of the basic units are limited, and maintenance of the network and creation of a new network are regulated. If sufficient energy is supplied, the number and type of the maintained networks will increase proportionally.

Figure 7:
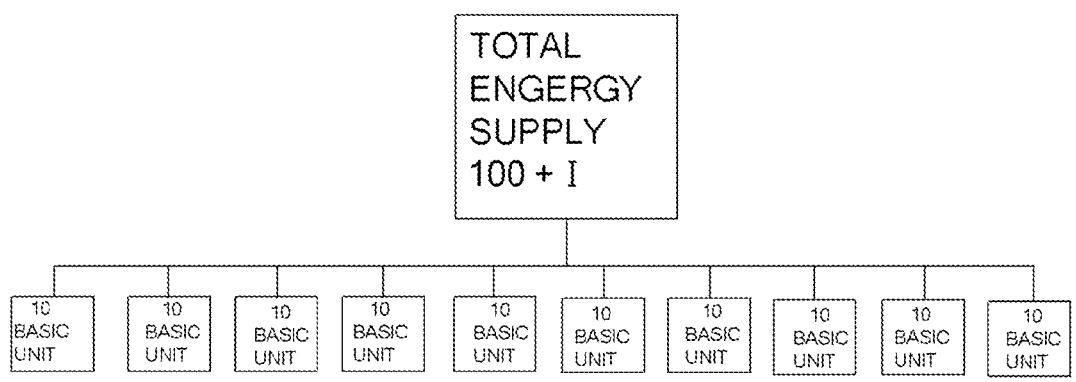
FIG. 7 is provided to explain appropriateness as to how the voluntary activity of a basic unit forms a network when limited power is supplied.

FIG. 7 is provided to explain appropriateness as to how the voluntary activity of a basic unit forms a network when limited power is supplied.

The total energy is limited and distributed in proportion to the energy consumption. However, the energy supply to the basic units is limited, and distributed in proportion to the energy consumption.

The energy supplied to the basic units may be divided at an upper level, instead of being supplied fairly at the basic unit level, and distributed at a lower level.

Accordingly, energy supply does not increase even when a basic unit at a lower level consumes more energy. Under this assumption, the energy supply may be expressed by mathematical expressions 1 and 2 as follows:

Assumption

Energy consumption at basic units=1, Total energy supply at initial phase=100

I=energy available for additional supply depending on total energy consumption

Energy consumption at basic unit A=Ea

Energy consumption at basic unit B=Eb $$\text{Energy supply to 10 basic units including } A=(9+Ea) \\ (100+I)/(99+Ea) \quad \text{Mathematical expression 1}$$

$$\text{Energy supply to 10 basic units including } B=10Eb \\ (100+I)/(99+10Eb) \quad \text{Mathematical expression 2}$$

Accordingly, to increase the energy supply for the basic units effectively, it is necessary that the units receiving energy supply at the same level form a network and act cooperatively and voluntarily.

That is, under assumption that a predetermined energy (cost) is consumed for a basic memory unit to act voluntarily, it is possible to regulate the voluntary activities by regulating the energy supply to the overall database.

Although the overall energy supply is limited, it is necessary to define an energy distribution rule among the basic memory units, considering the possibility that a specific basic memory unit can monopolize most energy evenly.

For example, if there are ten basic memory units and the total supply is 10, and if basic memory unit A uses 2 of energy, while the other nine basic memory units use 8, the energy supply to A is 2, while the energy supply is 8/9 to the rest basic memory units.

The above rule applies to not only the energy supplied for the ten basic memory units, but also the energy supplied for the total one hundred basic memories.

That is, cooperation among the basic memories of the network is necessary to obtain larger amount of energy distribution. Further, the basic memory units may form a network based on a rule that a basic memory unit receiving insufficient amount of energy than is used can be inactivated for a predetermined time.

As suggested above, the technical concept of the present invention resembles a neutron of a living organism, as in the case of human who forms long-term memory when the brain stops activity for sleeping at night through a process of reviewing and associating the information he experienced during the day.

The ability of a specific basic memory unit to mimic the other neighboring memory units and the unique ability thereof are in contrasting relationship with each other. While one memory unit may mimic what the memory unit next to it does, another memory unit may act according to self-decided rule instead of doing what the neighboring memory units do. For example, when a first basic memory unit of a network 'I' does activity 'A', a second basic memory unit may mimic activity 'A' to do activity 'Aa', and a third basic memory unit may do activity 'Ab'.

After all the basic memory units take turns, the first basic memory unit may then do various derivative forms of activity 'A' such as 'A', 'Ab', 'Ac', etc.

As the basic memory units of a network continue performing activities in the above-explained manner, the activity of the network may be consolidated into 'A' or 'Aa', or another. However, assuming that a certain basic memory unit 'i' of network 'I' has less tendency to mimic and stronger tendency to act 'B', the memory units after the basic memory unit 'i' may mimic 'i' to do 'B', 'Ba', or 'Bb'.

As a result, the network 'I' may be divided into activity 'A' and 'B'. The network of basic memory units performing 'B' may be defined to be a new network 'II'. The new network 'II' may include a core basic memory unit which may be basic memory unit 'i'.

The above suggests the existence of a core part to decide unchangeable characteristic of a network, while at the same time, there is also a part that easily changes to mimic and decide linkage with the other networks.

The above resembles brain cells, in which activity 'A' has a characteristic of 30 hz (30 activities per second), 'Aa' is 31 hz, and 'Ab' is 29 hz. Activity 'B' has a characteristic of 60 hz, 'Ba' is 61 hz, and 'Bb' is 59 hz.

A rule to limit the network size is necessary. To consolidate one network, it should be ensured that a similar activity is done as the activity of a basic memory unit which begun, within a predetermined time. Accordingly, if it is assumed that $1/1000$ second is taken for a specific basic memory unit take turns after another basic memory unit, the rule may dictate that all the basic memory units of the network take turn within $20/1000$ second. This rule thus indicates that the network is constructed under level 20.

The imitative nature of a basic memory unit has to be controlled. This can be expressed as the 'non-reacting period'. A basic memory unit on the boundary between network 'I' and network 'II' may be required to select between activity 'A' of network 'I' and activity 'B' of network 'II'.

The basic memory unit may mimic an activity that first comes. Accordingly, if the basic memory unit mimics activity 'A', the basic memory unit does not mimic another activity for $1/1000$ or $2/1000$ second. The basic memory unit does not mimic even when activity 'B' comes.

For 1 second, the basic memory unit at the boundary area may be acting 'A' for $300/1000$ second, and acting 'B' for $700/1000$ second. The association between networks 'I' and 'II' may thus be controlled.

According to the present invention, new association among the search words is proposed to the users based on the information about association with the keywords known by the users and modified according to how the users react. As a result, new and also useful associated words can be proposed.

The foregoing exemplary embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the scope of the claims. Many alternatives, modifications, and variations will be apparent to those skilled in the art.

What is claimed is:

1. A method of proposing a creative keyword on an internet search site, the method comprising:
   first setting step of setting coordinate regions of a plurality of memories of a database of a search server, and setting a plurality of information into a basic unit of network;
   modifying step of modifying user-inputted information at the search server into the basic unit of network;
   requesting step of retrieving from the database, information including at least (n) number of regions of the network coordinate regions of the basic unit, according to the user-inputted information at the search server;
   second setting step of overlapping the information including the at least (n) number of network regions, and setting a first limit region at a region including less than (m) number of network regions;
   comparing step of comparing, at a processor, energy consumptions of the first limit region and neighboring regions; and
   accessibility increasing/decreasing step of proposing the users with an associated search word including less than the (m) number of regions according to the result of comparison, and increasing or decreasing accessibility to the associated search word depending on whether the proposed search word is selected by the users or not,
   wherein the first setting step further comprises setting one of rules with various possibilities per basic unit, to a basic unit of network of the plurality of information,
   wherein the first setting step comprises setting a network with a possibility in inverse relationship with a distance to another basic unit at a near distance, according to a rule applied to the basic units.

2. The method of claim 1, wherein the first setting step comprises expressing data stored on a site, knowledge, dictionary, news, blog, or multimedia in the form of network in coordinate format.

3. The method of claim 1, wherein the requesting step comprises re-setting so that a random and probabilistic rule is set per basic unit during an intermission period where there is no input or output of information to or from the database.

* * * * *